United States Patent [19]

Olsen

[11] 4,447,032
[45] May 8, 1984

[54] MULTIPLE-TYPE CABLE MOUNTING APPARATUS AND METHOD

[75] Inventor: Roger F. Olsen, Cuyahoga Falls, Ohio

[73] Assignee: Incom International Inc., Pittsburgh, Pa.

[21] Appl. No.: 360,534

[22] Filed: Mar. 22, 1982

[51] Int. Cl.³ .......................................... F16M 13/00
[52] U.S. Cl. .................. 248/558; 74/501 R; 248/68.1
[58] Field of Search ............. 248/558, 68 R, 68 CB, 248/74 A; 403/400; 74/501 R

[56] References Cited

U.S. PATENT DOCUMENTS

| | | | |
|---|---|---|---|
| 2,979,554 | 4/1961 | Maitland | 248/74 A |
| 3,120,938 | 2/1964 | Lucas | 248/68 R |
| 3,387,343 | 6/1968 | Fitz-Gerald | 248/68 CB |
| 3,955,441 | 5/1976 | Johnson | 74/501 R |
| 3,982,304 | 9/1976 | Menshen | 248/68 CB |
| 4,244,544 | 1/1981 | Kornat | 248/74 A |

FOREIGN PATENT DOCUMENTS 7607 6/1980 European Pat. Off. ............ 403/400

*Primary Examiner*—William H. Schultz
*Assistant Examiner*—Ramon O. Ramirez
*Attorney, Agent, or Firm*—James C. Wray

[57] ABSTRACT

Dissimilar pairs of identical parallel longitudinal grooves having enlarged U-shape central pockets open outwardly along opposite faces of a support block for pivotally receiving correspondingly dissimilar end fittings of cable conduits. A U-shape retainer detachably connects to the block to hold the end fittings in the grooves. The block is connected to a mounting plate in any one of a plurality of positions. In use, the block is turned to match corresponding grooves and end fittings and is connected to the plate to support the cable in a desired position.

8 Claims, 7 Drawing Figures

MULTIPLE-TYPE CABLE MOUNTING APPARATUS AND METHOD

BACKGROUND OF THE INVENTION

This invention relates generally to control cables and more particularly has reference to a mounting apparatus and method for installing any one of various types of cables in a remote control device.

Pertinent U.S. and foreign patents are found in Class 24, subclasses 335, 336 and 339; Class 74, subclass 501R; Class 138, subclasses 103, 106 and 112; Class 248, subclasses 65, 68R and 68CB and Class 403, subclasses 389, 391, 396, 299 and 400 of the official classifications of patents in the U.S. Patent and Trademark Office.

Examples of pertinent patents are U.S. Pat. Nos. 3,982,304; 3,036,289; 4,073,200; 4,136,423; 4,114,241 and 4,185,515.

U.S. Pat. Nos. 4,073,200 and 4,185,575 relate to cable retainers.

U.S. Pat. No. 3,982,304 shows a clamping apparatus with a mounting member used to secure a tubular member to a wall. Recesses are provided to receive cables. A hinge allows the larger part to pivot away from the mounting piece.

U.S. Pat. No. 4,036,289 discloses a support system for tube bundles.

U. S. Pat. No. 4,136,423 shows a bracket and clamp.

U.S. Pat. No. 4,114,241 discloses interlocking clamps.

None of the patents discloses an apparatus or method for selectively installing any one of various types of cables into a control.

The need for such apparatus or method is readily apparent. The necessity of providing separate mounts for each of the various types of mechanical control cables and remote control devices currently available increases manufacturing, packaging and shipping costs, and results in a device which is complex and which is difficult to assemble, use or repair. A single mount which is capable of supporting various types of cables in various positions would avoid those problems.

The need is particularly acute with respect to remote control devices intended for use in vehicles. Examples of such devices are those disclosed in U.S. Pat. Nos. 4,131,037 and 4,137,779 for operating a transmission and throttle.

The commercial success of a control device is often dependent upon whether the device can be used in a variety of vehicles. Because different vehicles can be equipped with different control cables, it is essential that means be provided for readily adapting the control device to various types of cables. Prior art methods and apparatus have proved unsatisfactory.

SUMMARY OF THE INVENTION

The present invention overcomes many of the problems which exist in prior art apparatus and methods.

The invention is generally a mounting device intended for use with a one or two push-pull cable control system. Parallel longitudinal grooves in faces of support blocks receive cable conduit end fittings. Cylindrical pivots or trunions on the fittings are received in transverse pockets in the same faces of the blocks. A U-shaped retainer holds the cables in the grooves. The block is mounted on a mounting plate. The block is reversible for different size cables and fittings.

In use, the block is oriented to present to the cable being mounted the groove corresponding to the end fitting on the cable. The end fitting is mounted in the groove and the block is mounted on the support plate to properly position the cable.

Objects of the invention are, therefore, to provide an improved cable mounting apparatus and method and to provide a cable mounting apparatus and method which is capable of installing any one of various types of cables into a control.

Another object of the invention is to provide a remote control having the means for installing any one of various types of cables to the control.

Still another object of the invention is to provide a mounting to support two different types of cables. A further object of the invention is to provide such a mounting which can be used for single cable applications.

Yet another object of the invention is to provide a support provided with pockets on opposite sides for mounting various types of cables.

Another object of the invention is to provide a support which may be oriented to mount a cable in a proper location on a remote control device.

Still another object of the invention is to provide a retainer for locking cables into pockets of the support. A further object of the invention is to provide a retainer which also acts to temporarily lock cables to the support until the support is mounted on the remote control mounting plate.

A further object of the invention is to provide a retainer which securely locks the cables in mounted position when the support is mounted on the remote control.

A further object of the invention is to provide a support which is configured to accommodate clips for locking the cables into the support.

Another object of the invention is to provide cable mounting apparatus comprising a support having at least two grooves extending therethrough for mountingly receiving end fittings of cable conduits, at least one of said grooves having a configuration which differs from the configuration of other of said grooves for receiving an end fitting which differs from the end fitting received in said other grooves.

A further object of the invention is to provide a method for selectively mounting cables having dissimilar end fittings in a desired position comprising providing a support having spatially diverse means for mountingly receiving dissimilar end fittings, orienting the support to present to the cable being mounted the receiving means corresponding to the end fitting on said cable, and positioning the end fitting in the corresponding receiving means.

These and other and further objects and features of the invention are apparent in the disclosure which includes the above and below specification and claims and drawings.

DETAILED DESCRIPTION OF THE INVENTION

Figure 1:
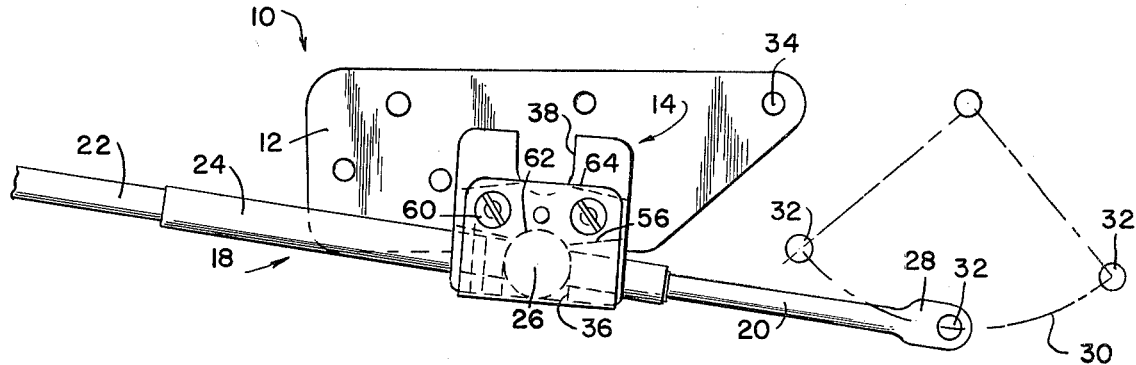
FIG. 1 is a plan view of a cable support embodying features of the present invention.

Referring to FIG. 1, the cable support of the present invention is indicated generally by the number 10. The support has a mounting plate 12, support block 14 and retainer 64.

A conventional push-pull cable assembly, indicated generally by the number 18, is pivotally mounted on the cable support 10. The assembly 18 has a rigid cable rod 20 crimped to the end of a flexible push-pull cable (not shown). The cable rod and cable are slidably mounted in a cable conduit 22. An end fitting 24 mounted on the end of the conduit 22 is provided with a cylindrical pivot or trunion 26.

The end of the cable rod 20 is provided with a fitting 28 for connecting the cable rod 20 to a push-pull cable control device (not shown) positioned adjacent the mounting plate 12. Typically, the fitting 28 is connected to a movable actuator arm or plate in the control device. Movement of the actuator causes the fitting 28 to travel along an arcuate path 30 between discreet positions 32. The positions 32 represent desired control settings, for example, the various gear settings of a transmission. Movement of the fitting 28 along the path 30 results in axial displacement of the cable within the conduit 22. The end of the cable remote from the cable rod 20 is operatively connected to the desired control device, for example, a vehicle transmission.

The control device is usually mounted on a wall or panel. The mounting plate 12 of the cable support 10 can also be mounted on the wall or panel or an adjacent wall or panel or it can be connected directly to the control device. The openings 34 in the mounting plate 12 are configured to receive bolts which can be used to attach the plate to a wall or panel or to the control device.

Figure 5:
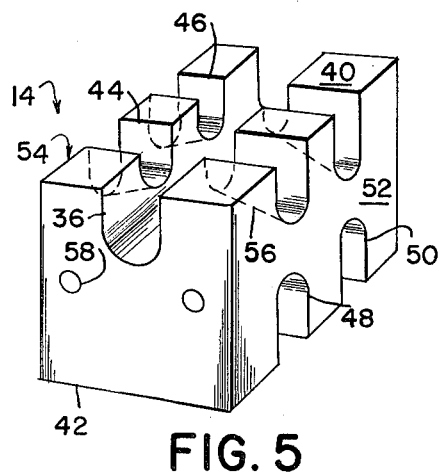
FIG. 5 is a perspective view of the block shown in FIGS. 1 and 2.
Figure 6:
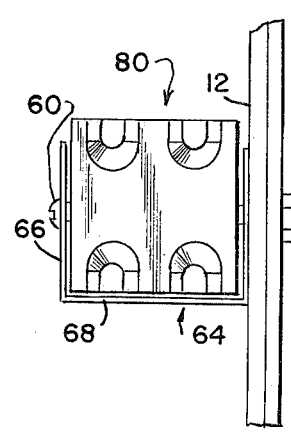
FIG. 6 is another side elevational view of the apparatus shown in FIGS. 1 and 2.

The support block 14 is shown in greater detail in FIG. 5.

The block 14 has a generally rectangular shape. A pair of parallel U-shape grooves 36 and 38 extend longitudinally along opposite faces 40 and 42 of the block 14. The grooves 36 and 38 open outwardly along the faces 40 and 42. The configuration of the groove 36 differs from the configuration of the groove 38 so that the grooves 36 and 38 can receive dissimilar end fittings. The nature of the dissimilarity between the grooves 36 and 38 is determined by the nature of the dissimilarity of the end fittings to be used. In some situations, it is contemplated that one or both of the grooves 36 and 38 may have a shape other than U-shape.

Typically, however, end fittings differ primarily in the diameter of the pivot or trunion. In those circumstances, the only difference between the grooves 36 and 38 will be the groove width.

Each of the faces 40 and 42 is also provided with a pair of parallel transverse grooves 44, 46, 48 and 50 which open outwardly along the faces 40 and 42 and which terminate in openings on the faces 52 and 54 which are perpendicular to the faces 40 and 42. The innermost surfaces of the grooves 44, 46, 48 and 50, for example the surface 56 of the groove 44, are inclined outwardly from the faces 52 and 54 toward the faces 40 and 42, so that the grooves 36 and 38 extend into the block 14 further than the adjacent portions of the grooves 44, 46, 48 and 50. The grooves 36 and 38 thus form recesses which bisect the grooves 44, 46, 48 and 50.

The end fitting of a cable assembly is mounted on the block 14 by aligning the pivot or trunion with the groove 36 or 38 having a size and shape corresponding to the pivot or trunion. The pivot or trunion is inserted into the groove through the opening on the face of the block 14. The portions of the end fitting extending radially outwardly from the pivot or trunion are received in the transverse groove intersecting the pivot-receiving groove.

FIG. 1 shows the end fitting 24 mounted in the block 14. It can be seen that the recess 62 formed by the longitudinal groove receives the pivot or trunion 26 and prevents transverse displacement thereof. The recess 62 also provides a bearing surface for rotation of the pivot or trunion 26. The inclined surface 56 of the transverse groove permits pivotal movement of the cable rod 20 within a defined boundary. That pivotal movement is caused by movement of the fitting 28 along the arcuate path 30.

The end fitting 24 is held in the block 14 by a U-shaped retainer 64 detachably connected to the block. The leg portions 66 of the retainer 64 overlay the faces of the block 14 provided with the through-bore openings 58 and the base portion 68 of the retainer 64 overlays the face of the block 14 through which the end fitting was inserted. The retainer base 68 thus closes the groove openings through which the end fitting was inserted and prevents removal of the end fitting from the groove.

If desired, the retainer base 68 can have a longitudinal dimension which is slightly less than the longitudinal dimensions of the faces 40 and 42. The retainer legs 68 will then press inwardly against the block 14 when the retainer 64 is placed over the block 14, so that the retainer 64 will have a strong frictional engagement with the block 14. The retainer will thus act to temporarily lock the end fitting 24 into the block 14.

The retainer legs 66 are provided with openings aligned with the through-bores 58. Bolts 60 are received within the openings and the through-bores to secure the retainer 64 to the block 14.

Figure 3:
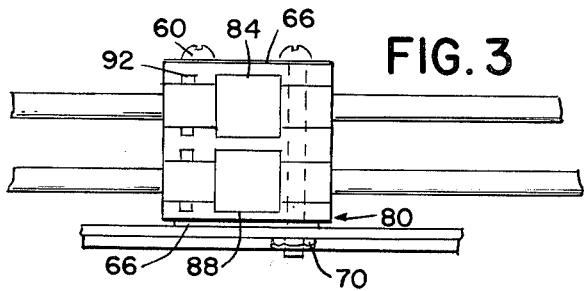
FIG. 3 is a side elevational view of another embodiment of the apparatus shown in FIGS. 1 and 2.

As shown in FIG. 3, the bolts 60 extend through the retainer 64 and block 14 and project through the openings 34 in the mounting plate 12. Nuts 70 are screwed onto the ends of the bolts 60 to secure the block 14 and retainer 64 to the mounting plate 12.

The mounting plate 12 is provided with a plurality of openings 34, as shown in FIG. 1, to allow the block 14 to be mounted in various positions and orientations. The particular mounting position and orientation used in any given situation is dictated by the requirements of the control device used. The block 14 must be positioned so that the cable assembly 18 is properly aligned with the actuator of the control device.

Figure 2:
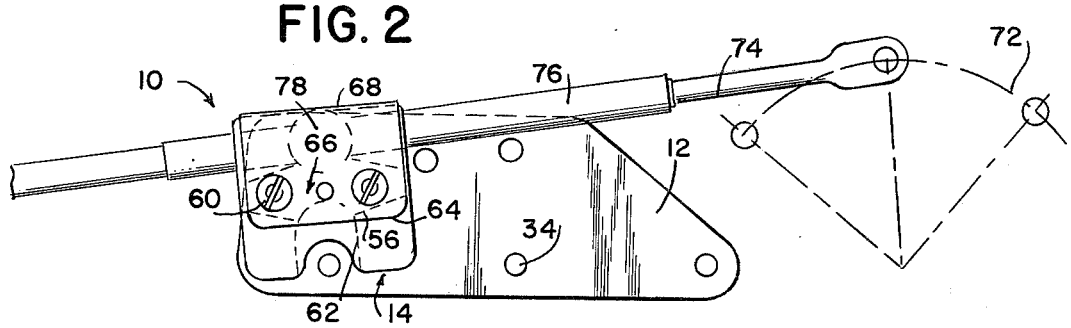
FIG. 2 is a plan view of the cable support apparatus of FIG. 1 in an alternative arrangement.

FIG. 2 shows the cable support apparatus 10 with the mounting plate 12 and block 14 in an alternative arrangement. The block 14 is mounted on the plate 12 so that the cable rod 74 approaches the arcuate path 72 at a different angle than the cable rod 20 approaches the arcuate path 30. That difference is due to the use of a different control device.

In addition, it can be seen that the end fitting 76 is received in the grooves formed on the face of the block 14 which is opposite the face having the grooves receiving the end fitting 24. As previously noted, end fittings typically differ in the diameter of the pivot or trunion. A comparison of FIGS. 1 and 2 shows that the pivot or trunion 78 on the end fitting 76 has a smaller diameter than the pivot or trunion 26 on the fitting 24. The longitudinal groove receiving the pivot or trunion 78 is thus correspondingly narrower than the longitudinal groove receiving the pivot or trunion 26. The transverse grooves receiving the portions of the end fitting 76 extending radially outwardly from the pivot or trunion 78 are similar to the transverse grooves receiving the corresponding portions of the end fitting 24. If the portions of the end fitting 76 received in the transverse grooves have smaller diameters than the corresponding portions of the end fitting 24 received in the transverse grooves, the transverse grooves receiving the end fitting 76 can be narrower than the transverse grooves receiving the end fitting 24.

Figure 4:
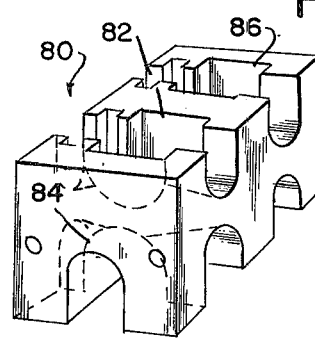
FIG. 4 is a perspective view of the block shown in FIG. 3.

FIGS. 3 and 4 show an alternative block 80 useful in the present invention. The block 80 differs from the block 14 only in the fact that discreet pockets 82, 84, 86 and 88 are used in place of the longitudinal grooves 36 and 38. The pockets 82, 84, 86 and 88 have the same cross sectional configuration as the grooves 36 and 38 and perform the same functions performed by the grooves 36 and 38. The block 80 has the advantage that the pockets 82, 84, 86 and 88 provide longitudinal support for the pivots or trunions received therein. The pockets 82, 84, 86 and 88 can thus be formed to center the end fitting in the transverse grooves to prevent the fitting from rubbing against the walls of the transverse grooves. In comparison, end fittings mounted in the block 14 will tend to rub against the walls of the transverse grooves 44, 46, 48 and 50, thereby resulting in increased wear of the end fitting and possible interference with the pivotal movement of the end fitting.

The configuration of the block is not limited to the two embodiments shown in FIGS. 4 and 5.

It is contemplated that the block can have a non-rectangular shape. The only limitation on selection of block shape is that the means for mounting dissimilar end fittings be spatially diverse so that the block can be adapted for receiving different end fittings by simply reorienting the block.

It is also contemplated that the block can have a greater or lesser number of grooves and pockets than the blocks shown in FIGS. 4 and 5. It is apparent that the block will not be adapted to support dissimilar end fittings if only one groove or pocket is provided. However, it is contemplated that the support apparatus of the present invention can be provided with a single groove or pocket and can be used to mount only one type of end fitting. Preferably, however, at least two dissimilar grooves for pockets are provided so that the block can support dissimilar end fittings.

The preferred block is provided with two dissimilar pairs of identical transverse grooves on opposite faces of the block, as shown in FIGS. 4 and 5. The block can thus be used in a one-cable or two-cable control system. In a one-cable system, only one of the transverse grooves receives an end fitting. In a two-cable system, both of the transverse grooves in one pair receive end fittings.

It is further contemplated that the block can be provided with non-parallel grooves for receiving end fittings.

Figure 7:
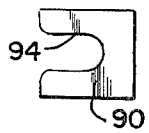
FIG. 7 is a side elevational view of a retainer clip used in the present invention.

The retainer clip 90 shown in FIG. 7 can be inserted in the slots 92 extending radially outwardly from the transverse grooves to secure end fittings having a diameter which is substantially less than the width of the transverse groove. The end fitting is received within the cut-out portion 94 of the clip 90 to hold the end fitting in position. The cut-out portion 94 if the clip 90 has a longitudinal dimension which is greater than the diameter of the end fitting to permit pivotal movement of the end fitting within the clip 90.

The method of the present invention can now be readily understood.

The mounting plate 12 is attached to the panel or wall adjacent the control device or is connected directly to the control device where appropriate. The block is rotated to present toward the end fitting of the cable assembly the face of the block provided with the grooves or pockets configured to receive that particular type of end fitting. The end fitting is inserted through the face and positioned in the grooves or pockets. The retainer is fit over the block to close the grooves and hold the end fittings in the block.

The block is arranged on the mounting plate so that the cable rod is properly positioned for connection to the actuator of the control device. The block is rigidly connected to the mounting plate by inserting the bolts through the aligned through-bores and openings and attaching nuts to the bolts.

The end fitting on the cable rod is then connected to the actuator of the control device.

If it becomes necessary to replace the original end fittings with dissimilar end fittings, the block is adapted to receive the new end fittings by simply turning the block to present toward the new end fitting the block face provided with the grooves or pockets configured to receive the new end fitting.

While the invention has been described with reference to specific embodiments, the exact nature and scope of the invention is defined in the following claims:

I claim:

1. Cable mount apparatus comprising a support block having at least two grooves extending therethrough for mountingly receiving end fittings of cable conduits, at least one of said grooves having a configuration which differs from the configuration of the other of said grooves for receiving an end fitting which differs from the end fitting received in said other grooves, the grooves being parallel longitudinal grooves opening outwardly along opposite faces of said support block, the grooves comprising a first pair of substantially identical grooves on an opposite face of said support block, said first pair of grooves having a configuration which differs from the configuration of the second pair of grooves, the grooves having enlarged central pocket portions configured to rotatably receive pivot members extending transversely from end fittings of cable conduits, the grooves being longitudinal grooves provided with U-shape central pocket portions opening outwardly along the faces of said support block, said pocket portions having greater lateral dimensions than said grooves, the grooves widening outwardly from the pocket portion to permit pivotal movement of the end fitting about the pocket portion, the grooves opening outwardly on opposite faces of said support block, and the leg portions of a U-shape retainer being detachably connected to faces between the said opposite faces, the base of the retainer closing said groove openings along said opposite faces to hold end fittings in the grooves, the support block being detachably connected to a mounting plate, the mounting plate being provided with a plurality of connecting means for mounting the support block in any one of the plurality of positions, and the support block being provided with at least one opening configured to receive a mounting bolt, the mounting plate being provided with a plurality of spaced openings alignable with the openings in the block for receiving a mounting bolt extending through the block, and at least one mounting bolt being provided for selectively securing the block to the plate at any one of said plurality of spaced openings.

2. The apparatus of claim 1 wherein said grooves are provided in opposite faces of said support block.

3. The apparatus of claim 1 wherein said grooves open outwardly along faces of said support block.

4. The apparatus of claim 1 wherein said grooves open outwardly and a retainer is detachably connected to the support to close said grooves and thereby hold end fittings in the grooves.

5. A method for selectively mounting cables having dissimilar end fittings in a desired position comprising providing a support having spatially diverse means for mountingly receiving dissimilar end fittings, orienting the support to present to the cable being mounted the receiving means corresponding to the end fittings on said cable, positioning the end fitting in the corresponding receiving means, the spatially diverse receiving means being mounted on opposite sides of a support block and the support block being turned to present to the cables being mounted the receiving means corresponding to the end fitting on the cable, locating and orienting the support to arrange the cables in the desired position, and fixing the support in the desired location and orientation.

6. Cable mount apparatus comprising a support block having at least one groove extending therethrough and opening outwardly along a face of the block for mountingly receiving an end fitting of a cable conduit, said groove having an enlarged central pocket portion configured to rotatably receive a pivot member extending transversely from the end fitting, and a retainer detachably connected to the block to close the groove and thereby hold an end fitting in the groove, the retainer being a U-shape retainer having leg portions detachably connected to the block, the base of the retainer closing said groove opening to hold the end fitting in the groove and the support block being provided with at least one opening configured to receive a mounting bolt, a mounting plate being provided with a plurality of spaced openings alignable with the openings in the block for receiving a mounting block extending through the block and at least one mounting bolt being provided for selectively securing the block to the plate at any one of said plurality of spaced openings.

7. The apparatus of claim 6 wherein said groove is a longitudinal groove provided with a U-shape central pocket portion opening outwardly along the face of said support block, said pocket portion having greater lateral dimensions than said groove.

8. The apparatus of claim 6 wherein said groove widens outwardly from the pocket portion to permit pivotal movement of the end fitting about the pocket portion.

* * * * *